United States Patent
Lu et al.

(10) Patent No.: US 10,723,890 B2
(45) Date of Patent: Jul. 28, 2020

(54) CURABLE FILM-FORMING SOL-GEL COMPOSITIONS AND ANTI-GLARE COATED ARTICLES FORMED FROM THEM

(71) Applicant: PPG INDUSTRIES OHIO, INC., Cleveland, OH (US)

(72) Inventors: Songwei Lu, Wexford, PA (US); Noel Vanier, Wexford, PA (US); Xiangling Xu, Pittsburgh, PA (US); Shanti Swarup, Allison Park, PA (US); David C. Martin, Bethel Park, PA (US); Kurt G. Olson, Gibsonia, PA (US); Irina Schwendeman, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 696 days.

(21) Appl. No.: 14/951,541

(22) Filed: Nov. 25, 2015

(65) Prior Publication Data

US 2016/0145441 A1    May 26, 2016

Related U.S. Application Data

(60) Provisional application No. 62/084,170, filed on Nov. 25, 2014.

(51) Int. Cl.

| | |
|---|---|
| *C09D 125/06* | (2006.01) |
| *C09D 5/00* | (2006.01) |
| *C09D 183/06* | (2006.01) |
| *C03C 17/30* | (2006.01) |
| *C08F 257/02* | (2006.01) |
| *C09D 183/02* | (2006.01) |
| *B05D 3/02* | (2006.01) |
| *B05D 5/06* | (2006.01) |
| *C09D 183/04* | (2006.01) |
| *G02B 1/111* | (2015.01) |
| *G06F 3/041* | (2006.01) |
| *C08K 3/28* | (2006.01) |
| *C08G 77/02* | (2006.01) |
| *C08G 77/14* | (2006.01) |

(52) U.S. Cl.
CPC ........... *C09D 5/006* (2013.01); *B05D 3/0236* (2013.01); *B05D 3/0272* (2013.01); *B05D 5/061* (2013.01); *C03C 17/30* (2013.01); *C08F 257/02* (2013.01); *C09D 125/06* (2013.01); *C09D 183/02* (2013.01); *C09D 183/04* (2013.01); *C09D 183/06* (2013.01); *G02B 1/111* (2013.01); *G06F 3/0412* (2013.01); *C03C 2217/29* (2013.01); *C03C 2217/732* (2013.01); *C03C 2218/112* (2013.01); *C03C 2218/32* (2013.01); *C08G 77/02* (2013.01); *C08G 77/14* (2013.01); *C08K 3/28* (2013.01); *G06F 2203/04103* (2013.01)

(58) Field of Classification Search
CPC .... C09D 5/006; C09D 183/02; C09D 183/04; C09D 125/06; C09D 183/06; C09D 7/65; C09D 7/61; C09D 7/70; C08F 257/02; B05D 3/0236; B05D 3/0272; B05D 5/061; B05D 2518/12; G02B 1/111; G06F 3/0412; G06F 2203/04103; G06F 3/041; C03C 17/30; C03C 2217/29; C03C 2217/732; C03C 2218/112; C03C 2218/32; C03C 17/007; C03C 2218/116; C03C 2218/31; C08G 77/02; C08G 77/14; C08G 77/08; C08G 77/18; C08K 3/28

See application file for complete search history.

(56) References Cited

U.S. PATENT DOCUMENTS

| | | | |
|---|---|---|---|
| 3,635,751 | A | 1/1972 | Long, III et al. |
| 4,753,827 | A | 6/1988 | Yoldas et al. |
| 5,725,957 | A | 3/1998 | Varaprasad et al. |
| 6,361,868 | B1 | 3/2002 | Bier et al. |
| 6,440,491 | B1 | 8/2002 | Varaprasad et al. |
| 6,558,804 | B2 | 5/2003 | Sato et al. |
| 7,294,405 | B2 | 11/2007 | Richter et al. |

(Continued)

FOREIGN PATENT DOCUMENTS

| | | |
|---|---|---|
| CN | 201310438218 | 9/2013 |
| CN | 103439761 A | 12/2013 |

(Continued)

OTHER PUBLICATIONS espacenet English abstract of CN 100582817 C.

*Primary Examiner* — Jonathan C Langman
(74) *Attorney, Agent, or Firm* — Krisanne Shideler

(57) ABSTRACT

Curable film-forming sol-gel compositions that are essentially free of inorganic oxide particles are provided. The compositions contain: a tetraalkoxysilane; a solvent component; and non-oxide particles, and further contain either i) a mineral acid or ii) an epoxy functional trialkoxysilane and a metal-containing catalyst. Coated articles demonstrating antiglare properties are also provided, comprising: (a) a substrate having at least one surface; and (b) a cured film-forming composition applied thereon, formed from a curable sol-gel composition comprising a silane and non-oxide particles. A method of forming an antiglare coating on a substrate is also provided. The method comprises: (a) applying a curable film-forming sol-gel composition on at least one surface of the substrate to form a coated substrate; and (b) subjecting the coated substrate to thermal conditions for a time sufficient to effect cure of the sol-gel composition and form a coated substrate with a sol-gel network layer having anti-glare properties.

9 Claims, No Drawings

(56) References Cited

U.S. PATENT DOCUMENTS

| | | |
|---|---|---|
| 7,723,404 B2 | 5/2010 | Cheng et al. |
| 8,003,194 B2 | 8/2011 | Richter et al. |
| 8,124,215 B2 | 2/2012 | Takao et al. |
| 8,124,224 B2 | 2/2012 | Kato et al. |
| 8,685,490 B2 | 4/2014 | Lu et al. |
| 8,710,146 B2 | 4/2014 | Xu et al. |
| 9,707,592 B2 * | 7/2017 | Lu .................... B05D 5/06 |
| 2002/0061407 A1 | 5/2002 | Colton et al. |
| 2002/0197409 A1 | 12/2002 | Varaprasad et al. |
| 2003/0157344 A1 | 8/2003 | Shoup et al. |
| 2005/0106377 A1 * | 5/2005 | Koestner ............. C08J 7/047 428/304.4 |
| 2006/0014101 A1 | 1/2006 | He et al. |
| 2006/0046071 A1 | 3/2006 | Richter et al. |
| 2007/0195419 A1 | 8/2007 | Tsuda et al. |
| 2007/0253064 A1 | 11/2007 | Ookubo et al. |
| 2009/0004462 A1 | 1/2009 | Zhang et al. |
| 2009/0169870 A1 * | 7/2009 | Zheng ................. C03C 17/007 428/332 |
| 2009/0279176 A1 | 11/2009 | Wang et al. |
| 2010/0079867 A1 | 4/2010 | Wakizaka et al. |
| 2010/0101649 A1 * | 4/2010 | Huignard ......... B32B 17/10036 136/261 |
| 2011/0242658 A1 | 10/2011 | Sarma |
| 2012/0200929 A1 | 8/2012 | Lu |
| 2012/0218640 A1 | 8/2012 | Gollier et al. |
| 2012/0275018 A1 | 11/2012 | Lu et al. |
| 2014/0134454 A1 | 5/2014 | Fuchs et al. |
| 2014/0176827 A1 | 6/2014 | Gollier et al. |
| 2015/0044481 A1 * | 2/2015 | Shibata ................ B32B 27/40 428/423.7 |

FOREIGN PATENT DOCUMENTS

| | | | |
|---|---|---|---|
| EP | 0356229 | 2/1990 | |
| EP | 1144486 | 11/2004 | |
| ER | 100582817 C | 1/2010 | |
| JP | H5-85714 | 4/1993 | |
| JP | WO2013129339 | * 9/2013 | ........... C09D 175/14 |
| KR | 2005-0020722 | 3/2005 | |
| RU | 2371399 C2 | 10/2009 | |
| TW | 201407794 A | 2/2014 | |
| WO | 200010934 A1 | 3/2000 | |
| WO | WO 2006025956 A1 | 3/2006 | |
| WO | 2012/166407 | 12/2012 | |
| WO | 2014/011328 | 1/2014 | |

* cited by examiner

CURABLE FILM-FORMING SOL-GEL COMPOSITIONS AND ANTI-GLARE COATED ARTICLES FORMED FROM THEM

CROSS-REFERENCE TO RELATED APPLICATION

This application claims priority from provisional U.S. Patent Application Ser. No. 62/084,170, filed Nov. 25, 2014, and entitled "ANTIGLARE COATED ARTICLES AND METHOD OF FORMING ANTIGLARE TOUCH SCREEN DISPLAYS AND OTHER ANTIGLARE COATED ARTICLES", which is incorporated herein by reference in its entirety.

FIELD OF THE INVENTION

The present invention relates to curable film-forming sol-gel compositions, coated articles demonstrating anti-glare properties formed from these compositions, and methods of forming anti-glare coatings on a substrate.

BACKGROUND OF THE INVENTION

Information displays such as touch screen displays appear more and more frequently on interactive electronic devices. Reducing glare of the screens, a brightness caused by the reflection of incident light, is desired to maximize visibility of the displays in different lighting environments. There are various known methods of reducing the glare of transparent substrate surfaces. An exemplary method involves depositing a light interference coating stack on the substrate that reduces reflection by exploiting the optical interference within adjacent thin films. Such films usually have a thickness of about one-quarter or one-half the nominal wavelength of visible light, depending on the relative indices of refraction of the coatings and substrate. Interference coatings reduce glare without reducing resolution. However, they are relatively expensive to deposit, requiring the use of vacuum deposition techniques such as sputtering and precise manufacturing conditions, or very precise alkoxide solution dip coating techniques, with subsequent drying and firing steps. Strict processing parameters must be observed to obtain the desired results.

Another method of reducing glare on displays involves forming a light scattering means at the surface of the substrate, such as by mechanically or chemically altering the outermost surface of the substrate or through use of a diffuser coating or a glare reducing film on the glass substrate.

Some antiglare coatings cause an undesirable visual side-effect called visual sparkling effect, resulting from the interaction of light from a regular display pixel matrix with irregular microstructures present in the antiglare coating surface. Most antiglare surfaces such as acid-etched anti-glare surfaces have a sparkling issue on high pixel per inch (PPI) displays.

Another option is the use of fillers. Fillers are widely used in the coatings industry to affect gloss and they are known to provide glare reduction to substrates in many cases. Fillers control gloss by affecting the surface roughness of an applied coating.

Etching the outer surface of the substrate or otherwise chemically or mechanically modifying the outer surface of a coating deposited on the substrate has also been attempted in an effort to reduce glare by diffusive reflection of light. There are numerous drawbacks to such modification techniques. Etching by chemical means involves handling and storage of generally highly corrosive compounds (e.g. hydrofluoric acid). Such compounds create processing and disposal problems in view of increasingly stringent environmental laws. Etching by non-chemical means, such as by sandblasting, necessitates additional and costly processing operations.

For touch screens such as those used on smart phones and tablets, a durable, anti-smudge coating is desired to ensure the cleanness and clarity of the touch screen surface. The anti-smudge coating is also expected to have a very smooth, silky, and slippery feel. Various super-hydrophobic coatings have demonstrated different degrees of anti-smudge properties and slipperiness. However, it is very difficult to achieve a better wear durability as tested using #0000 steel wool after more than 6000 cycles, and a coefficient of friction (COF) of ≤0.03.

It would be desirable to provide compositions that form an antiglare coating on a substrate while avoiding the drawbacks of the prior art, and to provide coated articles such as touch screen displays that demonstrate superior properties, including anti-glare.

SUMMARY OF THE INVENTION

A curable film-forming sol-gel composition that is essentially free of inorganic oxide particles is provided. The curable film-forming sol-gel composition comprises: (i) a tetraalkoxysilane: (ii) a mineral add; (iii) a solvent component; and (iv) non-oxide particles.

A second curable film-forming sol-gel composition that is essentially free of inorganic oxide particles is also provided. The second curable film-forming sol-gel composition comprises: (i) a tetraalkoxysilane; (ii) an epoxy functional trialkoxysilane; (iii) a metal-containing catalyst; (iv) a solvent component; and (v) non-oxide particles.

Coated articles demonstrating antiglare properties are also provided, An exemplary coated article comprises: (a) a substrate having at least one flat or curved surface; and (b) a cured film-forming composition applied to at least a portion of the surface of the substrate. The cured film-forming composition is formed from a curable sol-gel composition comprising a silane and non-oxide particles, the non-oxide particles have an average particle size, agglomerated or monodispersed, of between 50 nm and 2.0 microns, and the coated article demonstrates a 60° gloss value of 15 to 120 gloss units and a light transmittance of at least 84%.

A method of forming an antiglare coating on a substrate is also provided by the present invention, and may be used to prepare the coated articles above. The method comprises: (a) applying a curable film-forming sol-gel composition on at least one surface of the substrate to form a coated substrate; and (b) subjecting the coated substrate to thermal conditions for a time sufficient to effect cure of the sol-gel composition and form a coated substrate with a sol-gel network layer having anti-glare properties. The curable film-forming sol-gel composition is essentially free of inorganic oxide particles and comprises a silane and non-oxide particles. The non-oxide particles have an average particle size, agglomerated or monodispersed, of between 50 nm and 2.0 microns.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups such as alkoxysilane and silanol groups, by means that include, but are not limited to, thermal (including ambient cure), catalytic, electron beam, chemical free-radical initiation, and/or photoinitiation such as by exposure to ultraviolet light or other actinic radiation.

The term "cure", "cured" or similar terms, as used in connection with a cured or curable composition, e.g., a "cured composition" of some specific description, means that at least a portion of any polymerizable and/or crosslinkable components that form the curable composition is polymerized and/or crosslinked. Additionally, curing of a composition refers to subjecting said composition to curing conditions such as those listed above, leading to the reaction of the reactive functional groups of the composition. The term "at least partially cured" means subjecting the composition to curing conditions, wherein reaction of at least a portion of the reactive groups of the composition occurs. The composition can also be subjected to curing conditions such that a substantially complete cure is attained and wherein further curing results in no significant further improvement in physical properties, such as hardness.

The term "reactive" refers to a functional group such as an alkoxysilane or silanol group, capable of undergoing a chemical reaction with itself and/or other functional groups spontaneously or upon the application of heat or in the presence of a catalyst or by any other means known to those skilled in the art.

By "ambient conditions" is meant the condition of surroundings without adjustment of the temperature, humidity or pressure. For example, a composition that cures at ambient temperature undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.).

The terms "on", "appended to", "affixed to", "bonded to", "adhered to", or terms of like import means that the designated item, e.g., a coating, film or layer, is either directly connected to the object surface, or indirectly connected to the object surface, e.g., through one or more other coatings, films or layers.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such a glazing, or in combination with an optical article.

The term "rigid", as used for example in connection with an optical substrate, means that the specified item is self-supporting.

The term "optical substrate" means that the specified substrate is suitable for use in an optical article. Optical articles include, but are not limited to, lenses, optical layers, e.g., optical resin layers, optical films and optical coatings, and optical substrates having a light influencing property.

The term "transparent", as used for example in connection with a substrate, film, material and/or coating, means that the indicated substrate, coating, film and/or material has the property of transmitting visible light without appreciable scattering so that objects lying beyond are entirely visible.

By "essentially free" is meant that if a compound is present in a composition, it is present incidentally in an amount less than 0.1 percent by weight, often less than 0.05 percent by weight or less than 0.01 percent by weight, usually less than trace amounts.

The present invention provides curable film-forming sol-gel compositions. Sol-gels are dynamic systems wherein a solution ("sol") gradually evolves into a gel-like two-phase system containing both a liquid phase and solid phase, whose morphologies range from discrete particles to continuous polymer networks within the continuous liquid phase.

An exemplary composition comprises (i) a silane, typically a tetraalkoxysilane. Because of the sol-gel nature of the composition, the alkoxysilanes, when used, are hydrolyzed and they are partially condensed prior to curing of the layer. The hydrolyzed tetraalkoxysilane in the sol-gel layer typically comprises tetramethoxysilane and/or tetraethoxysilane. The tetraalkoxysilane is typically present in the curable film-forming composition in an amount of at least 1 percent by weight and less than 40 percent, or often less than 35 percent, or more often less than 30 percent by weight, based on the total weight of the curable film-forming composition.

The curable film-forming composition further comprises (ii) a mineral acid; i.e., an inorganic acid. Suitable mineral acids include sulfuric acid, nitric acid, hydrochloric acid, and the like. Nitric acid is most often used. The mineral acid is typically present in an amount such that the weight ratio of mineral acid to slime is greater than 0.001:1, typically greater than 0.01:1, greater than 0.03:1, or greater than 0.05:1. The weight ratio of mineral acid to silane is typically less than 0.12:1.

The curable film-forming composition additionally comprises (iii) a solvent. The solvent component may include water and one or more polar organic solvents. Suitable organic solvents typically have hydroxyl functional (i.e., alcohol) and/or ether functional groups. Examples include glycol ethers such as propylene glycol methyl ether, propylene glycol methyl ether acetate, dipropylene glycol monomethyl ether, and/or diethylene glycol monobutyl ether. Lower alkyl alcohols (e. g., having less than six carbon atoms) such as isopropanol and ethanol are also suitable.

The curable film-forming composition further comprises (iv) non-oxide particles. The non-oxide particles may be organic or inorganic. Suitable inorganic particles may include one or more of $Si_3N_4$, BN, SiC, and ZnS. The non-oxide particles typically have an average particle size, agglomerated or monodispersed, of between 50 nm and 2.0 microns. When the particles demonstrate an average particle size less than 1000 nm (i. e., less than 1 micron), they would be considered nanoparticles. Particle size may be determined from among the numerous techniques known in the art, such as the method described below. The particle size may be measured with a Malvern Zetasizer 3000HS, which is a high performance two angle particle size analyzer for the enhanced detection of aggregates and measurement of small or dilute samples, and samples at very low or high concentration using dynamic light scattering. Typical applications of dynamic light scattering are the characterization of particles, emulsions or molecules, which have been dispersed or dissolved in a liquid. The Brownian motion of particles or molecules in suspension causes laser light to be scattered at different intensities. Analysis of these intensity fluctuations yields the velocity of the Brownian motion and hence the particle size using the Stokes-Einstein relationship. The reported particle sizes for all examples are the Z average mean value.

Suitable organic particles include polymeric particles such as solid, including core-shell type, and/or hollow-sphere polymeric particles. Organic particles may comprise, for example, polystyrene, polyurethane, acrylic, alkyd, polyester, polysulfide, polyepoxide, polyurea, polyolefin, or silicone-containing rubber polymers. The organic polymeric particles are often provided in the form of a latex and the particles may, but do not necessarily, have cationic or anionic charges. When the organic polymer particles are in the form of a latex, the particles typically have an average particle size, agglomerated or monodispersed, of between 300 and 500 nm. Exemplary polymeric latices are described in U.S. Pat. No. 8,710,146, incorporated herein by reference in its entirety and described as follows:

Various compositions may be used for the particles in a latex as described in U.S. Pat. No. 8,710,146, including organic polymers such as polystyrene, polyurethane, acrylic polymers, alkyd polymers, polyesters, siloxane-containing polymers, polysulfides, and epoxy-containing polymers or semi-conductors such as cadmium. Alternatively, the particles may have a core-shell structure where the core can be produced from the same materials as the unitary particles. The shell may be produced from the same polymers as the core material, with the polymer of the particle shell differing from the core material for a particular array of the core-shell particles. The core material and the shell material have different indices of refraction. In addition, the refractive index of the shell may vary as a function of the shell thickness in the form of a gradient of refractive index through the shell thickness. The shell material is non-film-forming, whereby the shell material remains in position surrounding each particle core without forming a film of the shell material so that the core-shell particles remain as discrete particles within the polymeric matrix.

Typically, the particles in a latex of U.S. Pat. No. 8,710,146, are generally spherical. For core-shell particles, the diameter of the core may constitute 80 to 90% of the total particle diameter or 85% of the total particle diameter with the shell constituting the balance of the particle diameter and having a radial thickness dimension. The particles with a unitary structure (as opposed to core-shell) are produced in an emulsion polymerization process, such as free radical initiated polymerization, using an ionic monomer, yielding a dispersion of polymeric particles.

Useful ionic monomers are those having a sufficient affinity for the polymer particles to produce high surface charge on the particles, such that they readily self-assemble into a periodic array. The ionic monomer binds with the polymeric particles and exhibits a charge, thereby producing charged particles. The ionic monomer may be an ionic surfactant, but can be an ionic monomer that is not a surfactant.

The ionic monomer has an affinity with the polymeric particles such that at least 50% of the ionic monomer (in its disassociated, ionic state) that is added to the emulsion polymerization dispersion becomes bound to the particles. Alternatively, at least 70% or at least 90% of the disassociated, ionic monomer added to the dispersion is bound to the polymeric particles. This high affinity of the ionic monomer for the polymeric particles improves the efficiency with which the ionic monomer is used in the emulsion polymerization. A high percentage of the total ionic monomer added to the reaction mixture binds with the polymeric particles and is demonstrative of a higher binding efficiency of the ionic monomer, "Binds with", "bound to the polymeric particles" and like terms, when used in reference to the ionic monomer, means that the ionic monomer becomes covalently or otherwise bound to the particle, and/or that the ionic monomer itself becomes part of the polymer that comprises the particle. The bound ionic polymer, regardless of how its bound, remains substantially attached to and/or part of the particle during purification.

Sodium or ammonium salt of 3-allyloxy-2-hydroxy-1-propanesulfonic acid (COPS-1), 2-Acrylamido-2-methylpropane sulfonic acid, styrene sulfonic acid, and (meth) acrylic acid have commonly been used to prepare negatively charged particles. Vinylbenzyltrimethyl ammonium chloride, diallyldimethylammonium chloride, dimethylaminoethyl(meth)acrylate, tert-butylaminoethyl methacrylate, trimethyl(2-methacryloxylethyl)ammonium chloride, dimethylaminopropyl(meth)acrylamide, and trimethyl(2-methacrylamidopropyl)ammonium chloride have commonly been used to prepare positively charged particles.

Particularly useful ionic monomers are those that are minimally soluble in the dispersing fluid (e.g., water) of the particle dispersion.

Core-shell particles are produced by dispersing core monomers with initiators in solution to produce core particles. Shell monomers are added to the core particle dispersion, along with an ionic monomer (as described above for unitary particles), such that the shell monomers polymerize onto the core particles. The core-shell particles are purified from the dispersion by similar means as described above to produce a dispersion of only the charged particles, which then form an ordered array on a substrate when applied thereto."

Particularly suitable organic non-oxide particles for use in the compositions of the present invention include cationic or anionic latex dispersions of acrylic and/or polystyrene polymer particles, prepared from ethylenically unsaturated monomers such as one or more of styrene, (meth)acrylates and vinyl acetate. These latex dispersions of polymer particles may be prepared as described in the Examples below.

The non-oxide particles are typically present in the curable film-forming composition in an amount of at least 0.05 percent by weight and less than 20 percent, or often less than 10 percent, or more often less than 5 percent by weight, based on the total weight of the curable film-forming composition.

The present invention also provides a second curable film-forming sol-gel composition that is essentially free of inorganic oxide particles is also provided. The second curable film-forming sol-gel composition comprises: (i) a tetraalkoxysilane; (ii) an epoxy functional trialkoxysilane; (iii) a metal-containing catalyst; (iv) a solvent component; and (v) non-oxide particles.

The tetraalkoxysilane (i) may be any of those disclosed herein. The tetraalkoxysilane is typically present in the curable film-forming composition in an amount of at least 1 percent by weight and less than 20 percent, or often less than 15 percent, or more often less than 10 percent by weight, based on the total weight of the curable film-forming composition.

The second curable film-forming sol-gel composition further comprises (ii) an epoxy functional trialkoxysilane, such as 3-glycidoxypropyl trimethoxysilane, and 3-(Glycidoxypropyl)triethoxysilane. The epoxy functional trialkoxysilane may be partially hydrolyzed with water. The epoxy functional trialkoxysilane is typically present in the curable film-forming composition in an amount of at least 1 percent by weight and less than 80 percent, or often less than 50 percent, or more often less than 40 percent by weight, based on the total weight of the curable film-forming composition.

The second curable film-forming sol-gel composition additionally comprises (iii) a metal-containing catalyst, such as an aluminum-containing catalyst. Examples include aluminum hydroxychloride or aluminum acetylacetonate. Colloidal aluminum hydroxychloride catalysts are available from Summit Reheis as SUMALCHLOR 50 and from NALCO as NALCO 8676. The catalyst (iii) is typically present in the curable film-forming composition in an amount of at least 1 percent by weight and less than 35 percent, or often less than 30 percent, or more often less than 25 percent by weight, based on the total weight of the curable film-forming composition.

The second curable film-forming sol-gel composition also comprises (iv) a solvent component. The solvent component may include water and one or more polar organic solvents, including ethers such as cyclic ethers, glycol ethers, alcohols having 1 to 6 carbon atoms, such as methanol, ethanol, n-propanol, isopropanol, n-butanol, and the like. Glycol ethers such as propylene glycol methyl ether, propylene glycol methyl ether acetate, dipropylene glycol monomethyl ether, and/or diethylene glycol monobutyl ether are particularly suitable. The solvent (iv) is typically present in the curable film-forcing composition in an amount of at least 10 percent by weight and less than 80 percent, or often less than 70 percent, or more often less than 60 percent by weight, based on the total weight of the curable film-forming composition.

The second curable film-forming sol-gel composition also comprises (v) non-oxide particles. The non-oxides particles (v) may be any of those disclosed herein. The particles are typically present in the curable film-forming composition in an amount of at least 0.05 percent by weight and less than 20 percent, or often less than 10 percent, or more often less than 5 percent by weight, based on the total weight of the curable film-forming composition.

Each of the curable film forming compositions described herein can include a variety of optional ingredients and/or additives that are somewhat dependent on the particular application of the final coated article. For example, the composition may exhibit a light influencing property. Other optional ingredients include rheology control agents, surfactants, initiators, catalysts, cure-inhibiting agents, reducing agents, adds, bases, preservatives, free radical donors, free radical scavengers and thermal stabilizers, which adjuvant materials are known to those skilled in the art.

The curable film-forming compositions may include a colorant, although typically the compositions are colorless and transparent. They are also usually optically clear.

As used herein, the term "colorant" means any substance that imparts color and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), carbon black and mixtures thereof. The terms "pigment" and "colored filler" can be used interchangeably. Inorganic oxide pigments are typically not used.

Example dyes include, but are not limited to, those that are solvent and/or aqueous based such as add dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, quinizarin blue (D&C violet No. 2), and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2 and United States Patent Application Publication Number 20050287354. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle.

Dispersions of non-hiding, color-imparting organic pigment nanoparticles offer particularly useful aesthetic properties in the electronics industry. Such pigment dispersions are available from PPG Industries, Inc. under the trademark ANDARO. Low levels of blue nanopigments can offset any yellowing that may occur during curing of film-forming compositions. Blue or black nanopigments enhance the appearance of the anti-glare coating, particularly over black underlayers on a substrate. Moreover, colored nanopigments may be chosen to enhance or complement the underlying color of the substrate, such as if the substrate is a colored housing for a cell phone or tablet. Nanoparticle dispersion are particularly suitable for use in curable film-forming sol-gel compositions of the present invention that comprise (i) a tetraalkoxysilane; (ii) an epoxy functional trialkoxysilane; (iii) a metal-containing catalyst; (iv) a solvent component; and (v) non-oxide particles, as described herein.

In general, the colorant can be present in the coating composition in any amount sufficient to impart the desired property, visual and/or color effect. The colorant may be present in an amount from 1 to 65 weight percent of the present compositions, such as from 3 to 40 weight percent or 5 to 35 weight percent, with weight percent based on the total weight of the compositions.

The curable film-forming compositions of the present invention typically have a solids content of 0.1 to 10 percent by weight, often 0.5 to 10 percent by weight, more often 1 to 8 percent by weight, usually less than 7 percent by weight or less than 5 percent by weight, based on the total weight of the curable film-forming composition.

The curable film-forming compositions of the present invention may be prepared as described in the Examples herein.

The present invention is also drawn to coated articles demonstrating antiglare properties. An exemplary coated article comprises: (a) a substrate having at least one surface; and (b) a cured film-forming composition applied to at least a portion of the surface of the substrate. The cured film-forming composition is formed from a curable sol-gel composition comprising a silane and non-oxide particles, the non-oxide particles have an average particle size, agglomerated or monodispersed, of between 50 nm and 2.0 microns, and the coated article demonstrates a 60° gloss value of 15 to 120 gloss units and a light transmittance of at least 84%.

Substrates suitable for use in the preparation of the coated articles (such as touch screen displays) of the present invention can include glass or any of the plastic optical substrates known in the art, provided the material can withstand temperatures of at least 100° F. without deformation. Metals may also be used as substrates for the coated articles of the present invention. The substrates have at least one flat surface.

Suitable metal substrates include substrates made of, for example, highly polished stainless steel or other steel alloy, aluminum, or titanium. A polished metal substrate typically has a reflective surface. For example, the curable film-forming sol-gel composition may be deposited over a surface comprising a reflective material such as a polished metal, having a total reflectance of at least 30%, such as at least 40%. "Total reflectance" refers herein to the ratio of reflected light from an object relative to the incident light that impinges on the object in the visible spectrum integrating over all viewing angles, "Visible spectrum" refers herein to that portion of the electromagnetic spectrum between wavelengths 400 and 700 nanometers. "Viewing angle" refers herein to the angle between the viewing ray and a normal to the surface at the point of incidence. The reflectance values described herein may be determined using a Minolta Spectrophotometer CM 3600d or X-Rite i7 Color Spectrophotometer from X-Rite.

Aesthetically pleasing designs and effects may be achieved on a polished metal reflective surface by applying the curable film-forming sol-gel composition to portions of the surface, for example, in a visual pattern, or on the entire surface of the reflective substrate.

Suitable glass substrates include soda-lime-silica glass, such as soda-lime-silica slide glass sold from Fisher, or aluminosilicate glass such as Gorilla® glass from Corning Incorporated, or Dragontrail® glass from Asahi Glass Co., Ltd. In the present invention, the substrate is usually transparent and/or has at least one flat surface. Suitable examples of plastic substrates include polymers prepared from polyol (allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polymers prepared from polyol(meth)acryloyl terminated carbonate monomer, diethylene glycol dimethacrylate monomers, ethoxylated phenol methacrylate monomers, diisopropenyl benzene monomers, ethoxylated trimethylol propane triacrylate monomers, ethylene glycol bismethacrylate monomers, poly(ethylene glycol) bismethacrylate monomers, or urethane acrylate monomers; poly(ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products.

The cured film-forming composition (b) applied to at least a portion of the surface of the substrate (a) may be formed from any of the curable film-forming sol-gel compositions described herein; for example, the curable film-forming sol-gel composition may comprise either (A): (i) a tetraalkoxysilane; (ii) an epoxy functional trialkoxysilane; (iii) a metal-containing catalyst; (iv) a solvent component; and (v) non-oxide nanoparticles; or (s): (i) a tetraalkoxysilane; (ii) a mineral acid; (iii) a solvent component; and (iv) non-oxide particles.

An exemplary coated article according to the present invention demonstrates antiglare properties, and may comprise:
  (a) a substrate; and
  (b) a cured sol-gel layer applied on at least one surface of the substrate to form a coated substrate; wherein the sol-gel layer is deposited from a curable film-forming composition comprising:
    (i) a silane such as a tetraalkoxysilane present in an amount less than less than 40 percent, or often less than 35 percent, or more often less than 30 percent by weight, based on the total weight of the curable film-forming composition;
    (ii) a mineral acid present in an amount wherein the weight ratio of mineral acid to silane is greater than 0.001:1;
    (iii) a solvent; and
    (iv) non-oxide particles, wherein the curable film-forming composition has a solids content less than 15 percent by weight.

Coated articles of the present invention may comprise an optical article. Optical articles of the present invention include a display element such as screens, including touch screens, on devices including cell phones, tablets, GPS, voting machines, POS (Point-Of-Sale), or computer screens; display sheets in a picture frame; windows, or an active or passive liquid crystal cell element or device, and the like.

The present invention also provides a method of forming an anti-glare coating on a substrate. This method may be used to prepare the coated articles of the present invention that are described herein. Suitable substrates for use in the method of the present invention include any of those described herein. Typically the substrate comprises a plastic, glass, or metal. The method comprises: (a) applying a curable film-forming sol-gel composition on at least one surface of the substrate to form a coated substrate; and (b) subjecting the coated substrate to thermal conditions for a time sufficient to effect cure of the sol-gel composition and form a coated substrate with a sol-gel network layer having anti-glare properties. The curable film-forming sol gel composition is essentially free of inorganic oxide particles and comprises a silane and non-oxide particles. The non-oxide particles have an average particle size, agglomerated or monodispersed, of between 50 nm and 2.0 microns.

In the first step (a) of the method of the present invention, a curable film-forming sol-gel composition is applied to at least one surface of the substrate to form a coated substrata. The curable film-forming sol-gel composition may be any of the compositions of the present invention disclosed herein. For example, the curable film-forming sol-gel composition may comprise (A): (i) a tetraalkoxysilane; (ii) an epoxy functional trialkoxysilane; (iii) a metal-containing catalyst; (iv) a solvent component; and (v) non-oxide nanoparticles; or (B): (i) a tetraalkoxysilane; (ii) a mineral acid; (iii) a solvent component; and (iv) non-oxide particles.

The curable film-forming composition may be applied to the substrate by one or more of a number of methods such as spraying, dipping (immersion), spin coating, or flow coating onto a surface thereof. Spraying is used most often, such as ultrasonic spray application, precision spray application, and air atomized spray application. The curable film-forming composition and the substrate may be kept at ambient temperature immediately prior to application. The applied sol-gel layer typically has a dry film thickness of less than 10 microns, often less than 5 microns, or less than 3 microns.

The sol-gel composition may be applied to the substrate surface in such a manner as to yield a coated article with a gradient gloss across its surface; i. e., a surface with a gradually increasing gloss across a selected region, an effect achieved by gradually decreasing the thickness of the applied sot-gel composition coating layer across the substrate surface. As the thickness of the coating layer decreases, the gloss across the substrate surface increases, creating a visual effect. In the method of the present invention, spray application of the sol-gel composition is used to prepare a coated article with a gradient gloss. Rather than evenly spray-applying the composition over the entire surface of the substrate to form a coating layer with a consistent thickness, the spray nozzle may be held stationary over a selected point on the substrate or may make one or more passes over a selected region of the substrate. The thickness of the applied coating decreases with distance from the spray noble. The effect may also be achieved using a spray nozzle with graduated flow rates.

In step (b) of the method of the present invention, after application of the sol-gel layer, the coated substrate is then subjected to thermal conditions for a time sufficient to effect cure of the sol gel layer and form an antiglare coated article. For example, the coated substrate may be heated to a temperature of at least 80° C. for at least 10 minutes, to promote the continued polymerization of the composition. In particular examples, the coated substrate may be heated to a temperature of 120° C. for at least 3 hours, or the coated substrate may be heated to a temperature of at least 150° C. for at least 1 hour.

The sol-gel composition forms a matte finish (low gloss), antiglare coating on the substrate. Coated articles of the present invention formed by the method described above typically demonstrate a minimum 60° gloss value of 15 or 20 or 50 gloss units, and a maximum 60° gloss value of 100 or 120 gloss units, as measured by a micro-TRI-gloss meter from BYK-Gardner GmbH. Coated articles of the present invention demonstrate reduced glare (direct reflection of incident light) without reducing resolution of a display viewed through the article. This is particularly advantageous when the coated article is an optical article such as a screen, in particular, a touch screen, for an electronic device such as a phone, monitor, tablet, or the like.

The sol-gel network layer that is formed on the substrate in the method of the present invention comprises a hybrid "inorganic-organic" network; i. e., the network layer comprises both inorganic and organic structural groups on the molecular level. This allows for some variability in design with respect to mechanical properties of the sol-gel layer, such as flexibility.

At least one additional coating composition may be applied to the coated article after step (b). For example, an anti-fouling coating, anti-smudge coating, and/or sealant layer may be superimposed on at least one surface of the sol-gel layer. Anti-smudge coatings typically demonstrate a DI water contact angle greater than 100°. Suitable sealant layers may comprise perfluorosilane.

Each of the aspects and characteristics described above, and combinations thereof, may be said to be encompassed by the present invention. For example, the present invention is thus drawn to the following nonlimiting aspects:

1. A curable film-forming sol-gel composition that is essentially free of inorganic oxide particles and comprises:
   (i) a tetraalkoxysilane;
   (ii) a mineral acid;
   (iii) a solvent component; and
   (iv) non-oxide particles.

2. A curable film-forming sol-gel composition that is essentially free of inorganic oxide particles and comprises:
   (i) a tetraalkoxysilane;
   (ii) an epoxy functional trialkoxysilane;
   (iii) a metal-containing catalyst;
   (iv) a solvent component; and
   (v) non-oxide particles.

3. The composition according to any one of aspect 1 or aspect 2, wherein the tetraalkoxysilane (i) comprises tetramethoxysilane and/or tetraethoxysilane.

4. The composition according to aspect 1 wherein the mineral add (ii) comprises nitric add or hydrochloric add.

5. The composition according to any one of aspects 1 to 4 wherein the non-oxide particles are in the form of a latex and comprise hollow-sphere acrylic polymeric particles and/or solid polymeric particles.

6. The composition according to any one of aspects 2, 3, or 5, wherein the epoxy functional trialkoxysilane (ii) comprises glycidoxypropyl trimethoxysilane.

7. The composition according to any one of aspects 2, 3, 5 or 6, wherein the metal-containing catalyst (iii) comprises colloidal aluminum hydroxychloride or aluminum acetylacetonate.

8. The composition according to any one of aspects 1 to 7, wherein the non-oxide particles are inorganic and comprise at least one of $Si_3N_4$, BN, SiC, and ZnS.

9. A coated article demonstrating anti-glare properties, wherein the coated article comprises:
   (a) a substrate having at least one surface; and
   (b) a cured film-forming composition applied to at least a portion of the surface of the substrate, wherein the cured film-forming composition is formed from a curable sol-gel composition comprising a slime and non-oxide particles, the non-oxide particles have an average particle size, agglomerated or monodispersed, of between 50 nm and 2.0 microns, and the coated article demonstrates a 60° gloss value of 15 to 120 gloss units and a light transmittance of at least 84%.

10. The coated article according to aspect 9, wherein the curable film-forming sol-gel composition comprises any of those according to aspects 1 to 8.

11. The coated article according to either of aspects 9 and 10, wherein the article comprises a window, touch screen, cell phone screen, tablet screen, GPS screen, voting machine screen, POS (Point-Of-Sale) screen, computer screen, display sheet in a picture frame, or an active or passive liquid crystal cell element or device.

12. A method of forming an anti-glare coating on a substrate comprising:
   (a) applying a curable film-forming sol-gel composition on at least one surface of the substrate to form a coated substrate, wherein the curable film-forming sol-gel composition is essentially free of inorganic oxide particles and comprises a silane and non-oxide particles, the non-oxide particles have an average particle size, agglomerated or monodispersed, of between 50 nm and 2.0 microns; and
   (b) subjecting the coated substrate to thermal conditions for a time sufficient to effect cure of the sol-gel composition and form a coated substrate with a sol-gel network layer having anti-glare properties.

13. The method according to aspect 12 wherein the substrate comprises a plastic, glass, or metal.

14. The method according to any of aspects 12 and 13, wherein, immediately prior to application to the substrate, the substrate and the curable film-forming composition are kept at ambient temperature.

15. The method according to any of aspects 12 to 14, wherein the curable film-forming sol-gel composition comprises any of those according to aspects 1 to 8.

16. The method according to any of aspects 12 to 15, wherein the curable film-forming sol-gel composition is spray applied or spin coated onto the substrate in step (a).

17. The method according to any of aspects 12 to 16, wherein the coated substrate is heated to a temperature of at least 80° C. for at least 10 minutes in step (b).

18. The method according to any of aspects 12 to 17, wherein the coated article formed in step (b) demonstrates a 60° gloss value of 15 gloss units to 120 gloss units.

The following examples are intended to illustrate various aspects of the invention, and should not be construed as limiting the invention in any way.

EXAMPLES

Example 1

A dispersion of anionic polystyrene particles in water was prepared via the following procedure. 5.5 g of sodium bicarbonate from Aldrich Chemical Company, Inc., 2.5 g Sipomer PAM 200 from Rhodia, and 4.5 g CD552 (Methoxy polyethylene glycol (550) monomethacrylate) from Sartomer, 0.10 g sodium styrene sulfonate (SSS) from Aldrich Chemical Company, Inc., were mixed with 2260 g deionized water and added to flask equipped with a thermocouple, heating mantle, stirrer, reflux condenser and nitrogen blanket. The mixture was heated to 50° C. After that, mixture of 125 g Styrene monomer was charged. The mixture was then heated to 70° C. and held for 30 minutes. Next, sodium persulfate from the Aldrich Chemical Company, Inc. (9.6 g in 70 g deionized water) was added to the mixture under stirring. The temperature of the mixture was maintained at 70° C. for approximately 2 hours. Following that, a preemulsified mixture of 340 g deionized water. 6.0 g Reasoap SR-10 form Adeak, 420 g styrene, 1.2 g SSS, and 0.5 g sodium persulfate was divided into 3 parts, and charged into flask at 45 mins interval. Following that, a preemulsified mixture of 240 g deionized water, 3.0 g Reasoap SR-10 form Adeak, 135 g styrene, 135 g methyl methacrylate, 9.0 g ethylene glycol dimethacrylate, 1.2 g SSS, and 0.5 g sodium persulfate was divided into 2 parts, and charged into flask at 45 mins interval. The temperature of the mixture was hold at 70° C. for additional 2 hours to complete polymerization. The resulting dispersion was filtered through a one-micron filter bag. The volume average particle diameter was measured to be 240 nm by Zetasizer 3000HS.

Example 2

A dispersion of cationic polystyrene particles in water was prepared via the following procedure. 7.2 g Brij 35 from Aldrich, 7.2 g CD552 (Methoxy polyethylene glycol (550) monomethacrylate) from Sartomer, 3.6 g Dodecyltrimethyl ammonium chloride from Aldrich, and 6.0 g acetic acid were mixed with 3240 g deionized water and added to flask equipped with a thermocouple, heating mantle, stirrer, reflux condenser and nitrogen blanket. The mixture was first heated to 50° C., and then a mixture of 360 g styrene and 25 g methyl methacrylate monomer was charged. The mixture was then heated to 70° C. and held for 30 minutes. Next, azo-bis(methylpropionamide) dihydrochloride from the Aldrich Chemical Company, Inc. (9 g in 144 g deionized water) was added to the mixture under stirring. The temperature of the mixture was maintained at 70° C. for approximately 3 hours. Following that, a preemulsified mixture of 2500 g deionized water, 36 g Brij 35, 1080 g styrene, 32.4 g Dimethylaminoethyl methacrylate, 10.8 g acetic acid and 36 g CD552 was charged into flask over 90 minutes. After 30 minute holding, a mixture of 3.0 g t-butylhydroperoxide and 15 g deionized water was charged to flask. After that, a mixture of 1.50 g ascorbic acid and 40 g deionized water was charged over 15 minutes. The reaction was held at 70° C. for additional 1 hr. The resulting dispersion was filtered through a one-micron filter bag. The volume average particle diameter was measured to be 304 nm by Zetasizer 3000HS.

Example 3

In a vessel with a magnetic stir bar, 30.0 grams of tetraethyl orthosilica from the Sigma-Aldrich Corporation, 17.5 grams deionized water and 17.5 grams denatured ethyl alcohol were added and the solution was stirred on a magnetic stirrer for 10 min. During agitation, 1.8 grams of 4.68 wt % aqueous nitric acid was added to the above mixture. Thereafter the solution is stirred for 1 hour. Then, an additional 29.2 grams of denatured ethyl alcohol and 4.0 grams of polystyrene particles in water of Example 1 were added to the solution, which is stirred for 10 min.

Glass substrates (2"×3"×1 mm microscope slide glass purchased from Fisher Scientific) were pre-treated with a low pressure plasma system from Diener Electronics, Germany. The coating solutions were then sprayed on the glass substrates with a substrate temperature at room temperature using a SPRAYMATION and a Binks 95 automatic HVLP spray gun with a traverse speed of 600 inch/min. Four specimens of each example were prepared. The coated glass samples were then cured at 150° C. for 60 min.

Gloss, L*, a*, b*, Haze, T % at 550 nm, $R_a$, and pencil hardness were measured on these samples and were recorded in Table 1.

Example 4

In a vessel with a magnetic stir bar, 30.0 grams of tetraethyl orthosilica from the Sigma-Aldrich Corporation, 17.5 grams deionized water and 17.5 grams denatured ethyl alcohol were added and the solution was stirred on a magnetic stirrer for 10 min. During agitation, 1.8 grams of 4.68 wt % aqueous nitric acid was added to the above mixture. Thereafter the solution is stirred for 1 hour. Then, an additional 29.2 grams of denatured ethyl alcohol and 4.0 grams of polystyrene particles in water of Example 2 were added to the solution, which is stirred for 10 min.

Glass substrates (2"×3"×1 mm microscope slide glass purchased from Fisher Scientific) were pre-treated with a low pressure plasma system from Diener Electronics, Germany. The coating solutions were then sprayed on the glass substrates with as substrate temperature at room temperature using a SPRAYMATION and a Binks 95 automatic HVLP spray gun with a traverse speed of 600 inch/min. Four specimens of each example were prepared. The coated glass samples were then cured at 150° C. for 60 min.

Gloss, L*, a*, b*, Haze, T % at 550 nm, $R_a$, and pencil hardness were measured on these samples and were recorded in Table 1. Gloss is measured using a gloss meter, such as the micro-TRI-gloss meter, which directs a light at a specific angle to the test surface and simultaneously measures the amount of reflection. The 60° gloss is measured at an incident angle of 60°. A matte black background with a gloss value of <0.5 GU is placed under the transparent substrate to minimize the measurement error. The micro-TRI-gloss meter from BYK-Gardner GmbH conforms with ISO 2813, ISO 7668, ASTM D 523, ASTM D 2457, DIN 67530, JIS Z8741. Transmittance, color, and haze were measured using X-Rite 17 Color Spectrophotometer from X-Rite. Transmittance (T) and haze are reported as a percent (%). Pencil hardness is measured using protocols conforming with ASTM-D3363 standard, using HA-3363 Garoco® Pencil Scratch Hardness Kit from Paul N. Gardner Company, Inc., under a 500 g load.

Surface roughness ($R_a$) may be determined by testing coated substrates after cure using a Surftest SJ-210 Surface Roughness Measuring Tester from Mitutoyo Corporation. Measurements are usually taken in multiple locations on the substrate and an average reported. Higher values indicate greater roughness. The Surftest SJ-210 Surface Roughness Measuring Tester with a code of 178-561-01A uses a standard type drive unit with a 0.75 mN type detector and a compact type display unit. It has a 2 μm stylus tip radius and a detect measuring force of 0.75 mN. The tester is first calibrated with a precision roughness specimen with an $R_a$ of 2.97 μm. After calibration, the $R_a$ measurement is done according ISO 4287-1997 with a traverse speed of 0.5 mm/s, a cutoff related items λc of 0.8, and the number of sampling lengths as 5. A total of 6 data are taken from the sample surface in the area 5 mm from the edge. The average number is then recorded as the surface roughness $R_a$.

TABLE 1

|  | Samples | Gloss (GU) | L* | a* | b* | Haze (%) | T % at 550 nm | Ra (μm) | Pencil hardness 500 g load |
|---|---|---|---|---|---|---|---|---|---|
| Example 3 | 1 | 62.9 | 96.64 | −0.01 | −0.17 | 10.64 | 91.55 | 0.0993 | 7H |
|  | 2 | 53.7 | 96.48 | 0 | −0.14 | 12.1 | 91.14 | 0.1206 | 7H |
|  | 3 | 61.4 | 96.43 | 0 | −0.16 | 11.91 | 91.05 | 0.1050 | 7H |
|  | 4 | 42.4 | 96.44 | 0.04 | −0.32 | 18.01 | 91.04 | 0.1212 | 7H |
| Example 4 | 1 | 61.2 | 96.53 | 0.02 | −0.11 | 10.68 | 91.30 | 0.1040 | 9H |
|  | 2 | 57.2 | 96.43 | 0.02 | −0.10 | 11.42 | 91.01 | 0.1202 | 9H |
|  | 3 | 58.3 | 98.57 | 0.07 | −0.20 | 10.76 | 96.32 | 0.1172 | 9H |
|  | 4 | 49.5 | 98.67 | 0.09 | −0.28 | 13.88 | 96.57 | 0.1218 | 9H |

What is claimed is:

1. A coated article demonstrating anti-glare properties, wherein the coated article comprises:
   (a) a substrate having at least one flat surface; and
   (b) a cured film-forming composition containing non-oxide particles and applied to at least a portion of the flat surface of the substrate, wherein the cured film-forming composition is formed from a curable sol-gel composition comprising a silane and the non-oxide particles, wherein the non-oxide particles are selected from the group consisting of $Si_3N_4$; BN; SiC; Zn; polystyrene; polyurethane; acrylic; alkyd; polyester; polysulfide; polyepoxide; polyurea; polyolefin; silicone-containing rubber polymers; sodium salts of 3-allyloxy-2-hydroxy-1-propanesulfonic acid, 2-Acrylamido-2-methylpropane sulfonic acid, styrene sulfonic acid, or (meth) acrylic acid; ammonium salts of 3-allyloxy-2-hydroxy-1-propanesulfonic acid, 2-Acrylamido-2-methylpropane sulfonic acid, styrene sulfonic acid, or (meth) acrylic acid; Vinylbenzyltrimethyl ammonium chloride; diallyldimethylammonium chloride; dimethylaminoethyl (meth)acrylate; tert-butylaminoethyl methacrylate; trimethyl(2-methacryloxylethyl) ammonium chloride; dimethylaminopropyl (meth)acrylamide; trimethyl(2-methacrylamidopropyl) ammonium chloride; and mixtures thereof; wherein when the non-oxide particles are acrylic or polystyrene polymers, they are added to the curable sol-gel composition in the form of cationic or anionic aqueous dispersions of acrylic or polystyrene polymer particles, the non-oxide particles have an average particle size, agglomerated or monodispersed, of between 50 nm and 2.0 microns, and the coated article demonstrates a 60° gloss value of 15 to 120 gloss units and a light transmittance of at least 84%.

2. The coated article of claim 1, wherein the curable film-forming sol-gel composition comprises either (A):
   (i) a tetraalkoxysilane;
   (ii) an epoxy functional trialkoxysilane;
   (iii) a metal-containing catalyst;
   (iv) a solvent component; and
   (v) the non-oxide particles;
   or (B):
   (i) a tetraalkoxysilane;
   (ii) a mineral acid;
   (iii) a solvent component; and
   (iv) the non-oxide particles.

3. The coated article of claim 1, wherein the article comprises a window, touch screen, cell phone screen, tablet screen, GPS screen, voting machine screen, POS (Point-Of-Sale) screen, computer screen, display sheet in a picture frame, or an active or passive liquid crystal cell element or device.

4. A method of forming the coated article demonstrating anti-glare properties of claim 1 comprising:
   (a) applying a curable film-forming sol-gel composition on at least one surface of the substrate to form a coated substrate, wherein the curable film-forming sol-gel composition is essentially free of inorganic oxide particles and comprises a silane and non-oxide particles; wherein the non-oxide particles are selected from the group consisting of $Si_3N_4$; BN; SiC; Zn; polystyrene; polyurethane; acrylic; alkyd; polyester; polysulfide; polyepoxide; polyurea; polyolefin; silicone-containing rubber polymers; sodium salts of 3-allyloxy-2-hydroxy-1-propanesulfonic acid, 2-Acrylamido-2-methylpropane sulfonic acid, styrene sulfonic acid, or (meth) acrylic acid; ammonium salts of 3-allyloxy-2-hydroxy-1-propanesulfonic acid, 2-Acrylamido-2-methylpropane sulfonic acid, styrene sulfonic acid, or (meth) acrylic acid; Vinylbenzyltrimethyl ammonium chloride; diallyldimethylammonium chloride; dimethylaminoethyl (meth)acrylate; tert-butylaminoethyl methacrylate; trimethyl(2-methacryloxylethyl) ammonium chloride; dimethylaminopropyl (meth)acrylamide; trimethyl(2-methacrylamidopropyl) ammonium chloride; and mixtures thereof; wherein when the non-oxide particles are acrylic or polystyrene polymers, they are added to the film-forming sol-gel composition in the form of cationic or anionic aqueous dispersions of acrylic or polystyrene polymer particles, the non-oxide particles have an average particle size, agglomerated or monodispersed, of between 50 nm and 2.0 microns; and
   (b) subjecting the coated substrate to thermal conditions for a time sufficient to effect cure of the sol-gel composition and form a coated substrate with a sol-gel network layer having anti-glare properties.

5. The method of claim 4 wherein the substrate comprises a plastic, glass, or metal.

6. The method of claim 4, wherein, immediately prior to application to the substrate, the substrate and the curable film-forming composition are kept at ambient temperature.

7. The method of claim 4, wherein the curable film-forming sol-gel composition comprises either (A):
   (i) a tetraalkoxysilane;
   (ii) an epoxy functional trialkoxysilane;
   (iii) a metal-containing catalyst;
   (iv) a solvent component; and
   (v) the non-oxide particles;
   or (B):
   (i) a tetraalkoxysilane;
   (ii) a mineral acid;
   (iii) a solvent component; and
   (iv) the non-oxide particles.

8. The method of claim 4 wherein the curable film-forming sol-gel composition is spray applied or spin or dip coated onto the substrate in step (a).

9. The method of claim 4 wherein the coated substrate is heated to a temperature of at least 80° C. for at least 10 minutes in step (b).